United States Patent
Bachhuber et al.

(10) Patent No.: US 8,117,366 B2
(45) Date of Patent: Feb. 14, 2012

(54) METHOD AND DEVICE FOR DETECTING LOCATIONS OF BUS SUBSCRIBERS

(75) Inventors: Martin Bachhuber, Altdorf (DE); Steffen Bachmaier, Nurnberg (DE)

(73) Assignee: Diehl Aerospace GmbH, Uberlingen BRD (DE)

( * ) Notice: Subject to any disclaimer, the term of this patent is extended or adjusted under 35 U.S.C. 154(b) by 0 days.

(21) Appl. No.: 12/501,746

(22) Filed: Jul. 13, 2009

(65) Prior Publication Data
US 2010/0023663 A1 Jan. 28, 2010

(30) Foreign Application Priority Data
Jul. 24, 2008 (DE) .......... 10 2008 034 445

(51) Int. Cl.
*G06F 13/00* (2006.01)
(52) U.S. Cl. ........ 710/110; 710/105
(58) Field of Classification Search ......... 710/104–110, 710/305–312, 8–12, 15–16; 709/208, 221, 709/253; 713/330, 340
See application file for complete search history.

(56) References Cited

U.S. PATENT DOCUMENTS

| | | | | |
|---|---|---|---|---|
| 5,438,666 A * | 8/1995 | Craft et al. ............. | 710/22 |
| 5,761,451 A * | 6/1998 | Abert et al. ............. | 710/113 |
| 6,366,976 B1 * | 4/2002 | Ochsenreither ............. | 710/305 |
| 6,397,280 B1 * | 5/2002 | Nitschke et al. ............. | 710/110 |
| 6,421,710 B1 * | 7/2002 | Jasperneite et al. ............. | 709/208 |
| 6,513,080 B1 * | 1/2003 | Haq ............. | 710/107 |
| 6,670,882 B1 * | 12/2003 | Bachar ............. | 340/3.5 |
| 6,842,808 B2 * | 1/2005 | Weigl et al. ............. | 710/117 |
| 6,859,883 B2 * | 2/2005 | Svestka et al. ............. | 713/320 |
| 6,907,488 B1 * | 6/2005 | Diehl ............. | 710/305 |
| 6,978,328 B1 * | 12/2005 | Osaka et al. ............. | 710/107 |
| 6,990,540 B2 * | 1/2006 | Dalakuras et al. ............. | 710/110 |
| 7,076,694 B2 * | 7/2006 | Schuster ............. | 714/43 |
| 7,146,450 B2 * | 12/2006 | Saitou et al. ............. | 710/306 |
| 7,284,078 B2 * | 10/2007 | Fleury ............. | 710/107 |
| 7,519,005 B2 * | 4/2009 | Hejdeman et al. ............. | 370/252 |
| 7,606,955 B1 * | 10/2009 | Falik et al. ............. | 710/110 |
| 2009/0089469 A1 * | 4/2009 | Zeng et al. ............. | 710/110 |

* cited by examiner

*Primary Examiner* — Raymond Phan
(74) *Attorney, Agent, or Firm* — Scully, Scott, Murphy & Presser, P.C.

(57) ABSTRACT

In order to register the order of bus subscribers (12) when starting a system without the use of a token line to be specifically laid for his purpose along the two-wire bus (11), the bus master (13) temporarily activates a reflective discontinuity, preferably a bus short circuit, in a respective selectively addressed one of the subscribers (12) after stochastically determining all subscriber addresses (Ki). The echo signal (19) of a voltage jump (18), which is then output onto the bus (11) by the master (13), is superimposed in the master (13) to form a square-wave-like differential signal (20) whose pulse duration which is proportional to the distance between the master (13) and that subscriber (12) along the bus (11) is measured following pulse shaping by analog pulse area integration (25).

11 Claims, 2 Drawing Sheets

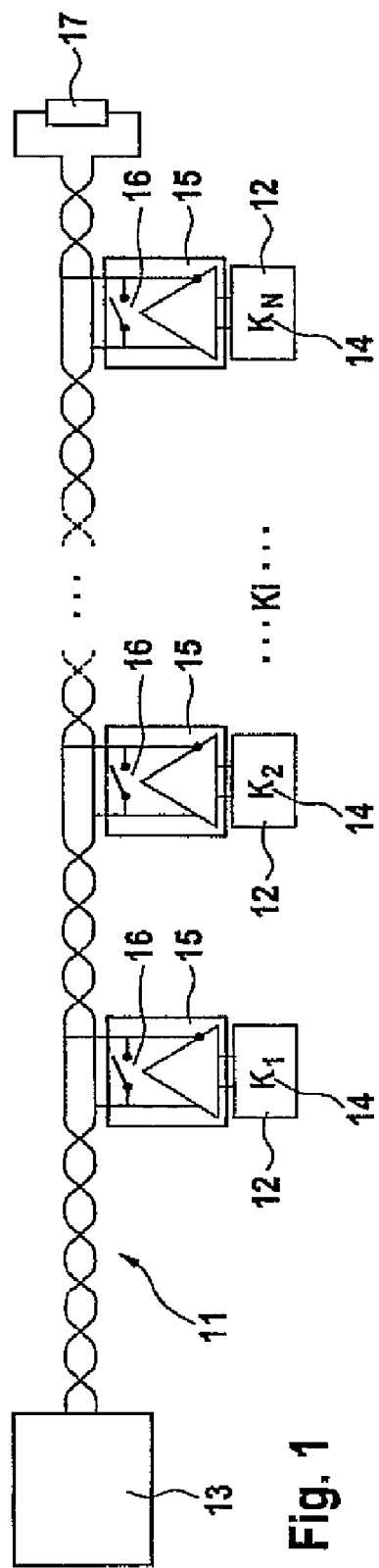
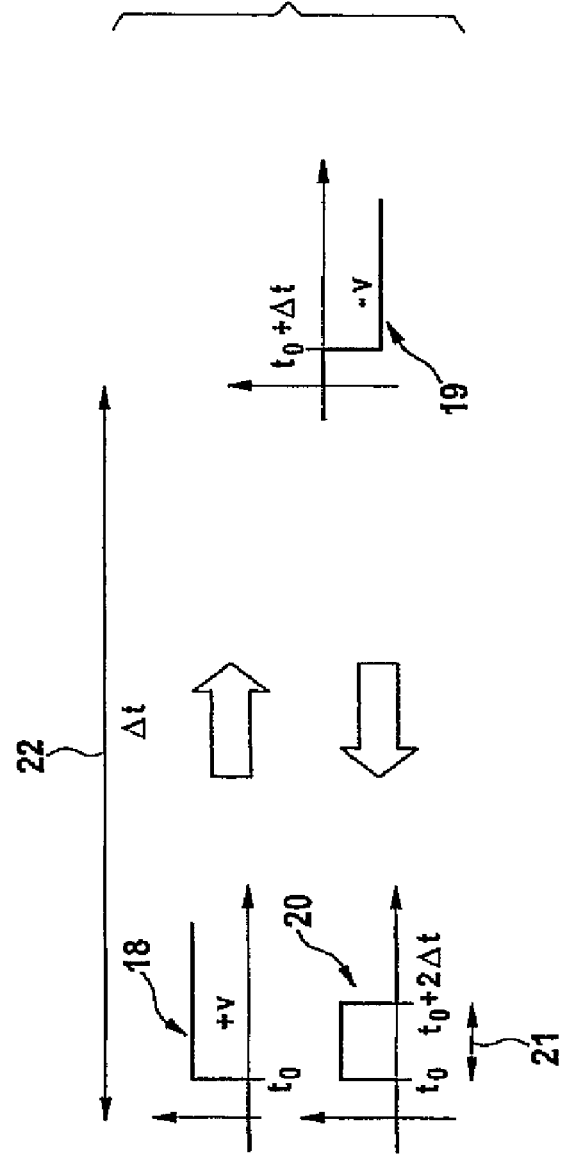

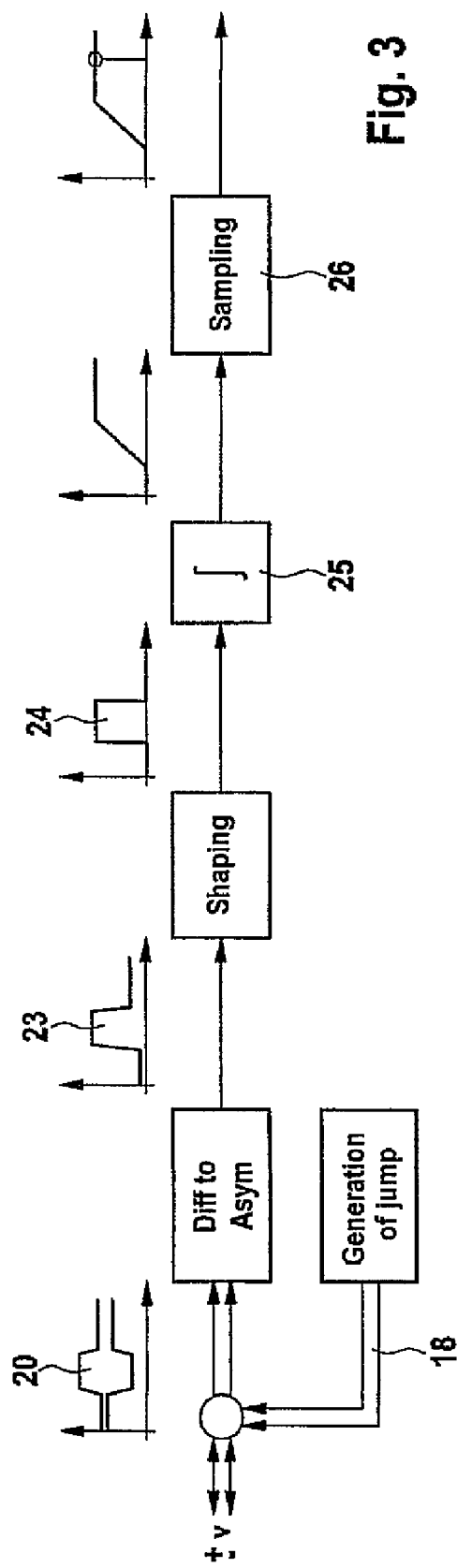

METHOD AND DEVICE FOR DETECTING LOCATIONS OF BUS SUBSCRIBERS

I. BACKGROUND OF THE INVENTION

1. Field of the Invention

The invention relates to a method and device for detecting bus subscribers and solving the problem of being able to address the bus subscribers of a parallel bus in a location-selective manner from a master via the bus, for instance in order to give rise to specific effects at particular locations.

2. Discussion of the Prior Art

For this purpose, when the system is started, the master must be informed of the location at which an individually addressable bus subscriber (slave) is connected to the bus. In order to effect this, it is customary to serially loop a so-called token line through all bus subscribers, said token line having an interruption which can be bridged in each bus subscriber. A token signal which is emitted by the master when the system is started passes only to the first interruption point and thus only to the first of the subscribers connected to the bus over the course of the latter. The particular subscriber responds to the signal with the acknowledgement of its identification address and then bridges its interruption, with the result that the next token signal passes to the next bus subscriber and so on until the ID addresses of all bus subscribers have been registered by the master in their physical order along the bus. If the course of the bus is known, particular seats, for example in the passenger cabin of an aircraft, can be individually supplied with light or air, or running light phenomena whose colour and brightness differences can be specifically controlled over the longitudinal extent of the passenger cabin. However, such a token procedure makes it possible to determine only the individual sequence of bus subscribers but not their distance from the master and thus their physical position along the bus. In view of the problem of the amount of space required for the cabling in aircraft, in particular, it is detrimental to have to lay a separate line parallel to the overall extent of the bus only for this initialization when starting the system, which line is then no longer required during operation. The use of the token line results in an additional weight which is not inconsiderable, and, in addition, the amount of space required for two additional connectors for entry and exit of the token line becomes noticeable in each of the bus subscribers.

II. SUMMARY OF THE INVENTION

With knowledge of these facts, the present invention is based on the technical problem of being able to determine the spatial assignment (also referred to as "physical to logical mapping") of the individual subscribers on the parallel bus with less outlay on wiring and nevertheless in a more meaningful manner when the system is started.

This object is achieved, according to the essential features specified in the two main claims, with functional parallelization of the entire bus system. According to this, the outlay on wiring for an additional token line and the additional weight of the latter as well as the additional need for connectors on the bus subscribers are now completely dispensed with.

Instead, when starting the system, all bus subscribers register their ID addresses with the master via the bus after random waiting times and thus in a random and variable order, said master documenting the current registration and reconfirming it via the bus, thus precluding further registration attempts by this subscriber until the next system start. In the event of registration collisions involving bus subscribers, the registration attempts by the latter are repeated, if necessary with changed waiting times, until a registration no longer occurs because all of the subscribers have successfully registered.

After this, at the latest, the master addresses—in principle in any desired order—each bus subscriber in succession using the latter's ID address via the bus and thus gives rise to a temporary discontinuity in the subscriber for the purpose of influencing the reflection property of the two-wire bus line; a procedure which can also be repeated during short interruptions in bus operation, for instance in order to detect the position of recently connected subscribers.

That discontinuity may involve opening the bus lines; however, for reasons of system reliability, the bus is expediently not interrupted but rather is subjected to severe additional loading, that is to say attenuated, at the location of the addressed subscriber, preferably even temporarily resistively short-circuited. In the meantime, the master then feeds a signal into the bus, which signal is reflected at this discontinuity in the subscriber. The delay from the transmitting time to the reception of the signal echo is measured and represents a distance measure of the spatial position of the subscriber along the course (which is known by design) of the bus. The reflection influence is then cancelled again in this subscriber (that is to say the relay/normally open contact pairing, for instance, of a short-circuit switch is enabled to open again until the next system start) and the local position of another subscriber along the course of the bus is then determined in the same manner until the location information for all bus subscribers documented in the master has been stored for the ID addresses of said bus subscribers along the bus (that is to say no longer only the sequences thereof). It is now possible to initiate spatially selective control measures by selectively controlling subscribers along the parallel bus without requiring a separate token line.

However, the echo propagation times for determining the distance between a subscriber and the master are very short. In order to nevertheless avoid having to expend the outlay on circuitry for a digital propagation time measurement, one development of the invention provides for the master to output a voltage jump onto the bus as a localization signal. This is because, as soon as an echo has been superimposed on said signal in the master, a differential signal is produced therein, the length of which differential signal is directly proportional to the line length of the bus between the master and the currently addressed subscriber. This length is detected in an analogous manner, namely using the area integral of the signal which, given a known pulse amplitude, specifies the pulse duration and thus the distance.

III. BRIEF DESCRIPTION OF THE DRAWINGS

Additional developments and alternatives to the solution according to the invention emerge from the other claims and, also as regards their advantages, from the following description of a sketched preferred example of a circuit for implementing the invention. In the drawing:

FIG. 1 shows a block diagram of the bus equipment,
FIG. 2 shows echo position determination in FIG. 1, and
FIG. 3 shows the evaluation of the echo signal according to FIG. 2.

IV. DETAILED DESCRIPTION OF THE INVENTION

The two-wire bus 11 sketched in the form of a block diagram in FIG. 1 is connected downstream of a master 13 which is common to all bus scribers 12. Each subscriber 12 is personalized by its ID address 14 (Ki) and can be individually addressed by the master 13 after registering with the latter. Each subscriber 12 is provided with a load circuit 15, preferably with a short-circuit switch 16 as sketched, which is inactive during normal operation.

If the distance between one of the subscribers 12 and the master 13 is intended to be determined, namely, in particular, in connection with a system start, the master 13 causes the load circuit 15 to be activated in that subscriber 12, that is to say causes the short-circuit switch 16 to be closed in the exemplary situation illustrated. As a result, the master 13 no longer sees the reflection-free line termination 17 of the bus 11 because a signal passed onto the bus 11 by the master 13 undergoes determined reflection at this discontinuity, especially in the event of a short circuit.

For such position determination, the master 13 outputs (+v) a voltage jump 18 (FIG. 2) onto the bus 11, which voltage jump is reflected in the subscriber 12 with the load circuit 15 which has just been activated. This echo signal 19 is the reverse (−v) of the emitted voltage jump and, in the master 13, meets the output voltage of the voltage jump 18 which is still applied. This results in a differential signal 20 whose length 21 is proportional to twice the bus line distance 22 between the master 13 and the addressed subscriber 11, as plotted in FIG. 2 as "2×Delta_t".

This differential signal 20 obtained from the echo superimposition is greatly rounded in practice. According to FIG. 3, a potential shift to form an asymmetrical signal 23 and pulse shaping of the latter to form the square-wave signal 24 with a predefined constant amplitude are therefore expediently carried out, the time integral of said square-wave signal being sampled, as illustrated in FIG. 3 by the integrator 25 with a downstream sampling circuit 26.

In order to register the order of bus subscribers 12 when starting a system without the need for a token line to be specifically laid for this purpose along the two-wire bus 11, the bus master 13 thus temporarily activates, according to the invention, a reflective discontinuity, preferably a bus short circuit, in a respective selectively addressed one of the subscribers 12 after stochastically determining all subscriber addresses Ki. The echo signal 19 of a voltage jump 18, which is then output onto the bus 11 by the master 13, is thus superimposed in the master 13 to form a square-wave-like differential signal 20 whose pulse duration which is directly proportional to the distance between the master 13 and that subscriber 12 along the bus 11 is measured using the integrator 25 following pulse shaping to form an idealized square-wave signal 24 by means of analogue pulse area integration. The outlay on circuitry required for this purpose is constant irrespective of the number of subscribers 12 since it must be implemented only once, namely in the master 13. This simultaneously affords the advantage that circuitry tolerances have the same effect on all position measurements, which mitigates the demands imposed on the accuracy of the measuring system. However, in the preferred implementation, extra equipment for the individual subscribers 12 is essentially restricted to an additional relay with a pair of normally open contacts for the temporary bus short circuit.

LIST OF REFERENCE SYMBOLS

11 Bus
12 Subscriber (on 11)
13 Master (upstream of 11)
14 ID address (of 12)
15 Load circuit (in 12)
16 Short-circuit switch (of 15)
17 Line termination (on 11 opposite 13)
18 Voltage jump (in 13)
19 Echo signal (for 18)
20 Differential signal (from 18 and 19)
21 Length (of 20)
22 Distance (from 12 to 13 via 11)
23 Asymmetrical signal (from 19)
24 Square-wave signal (from 23)
25 Integrator (for 24)
26 Sampling circuit (downstream of 25)

What is claimed is:

1. A method for detecting subscribers, which are connected to a parallel bus, by their bus master, wherein the subscribers register their identification addresses on the occasion of a system start, whereupon the master causes a reflective line discontinuity in a respective one of the subscribers and outputs a voltage jump onto the bus, wherein a differential signal length of said voltage jump which results from the superimposition with an echo signal, is measured as a measure of a distance between the master and said one subscriber along the bus.

2. A method according claim 1, wherein for the line discontinuity, the bus is temporarily additionally loaded at said one subscriber.

3. A method according to claim 1, wherein that the length of the resultant differential signal is measured, following signal shaping, by way of a pulse area integration.

4. A method according to claim 1, wherein the subscribers register with the master after any desired and variable waiting times and, in the event of a registration collision, repeat the registration process after any further desired and variable waiting times.

5. A method according to claim 1, wherein in order to determine the respective subscriber distance, the master randomly accesses the subscribers by temporarily switching on their respective short circuit.

6. A method according to claim 2, wherein a bus short circuit is performed as said additional loading.

7. A device for detecting subscribers, which are connected to a parallel bus, by their bus master which records the ID addresses of the subscribers registering via the bus, to individually address said subscribers, so as to cause a reflective line discontinuity in a respective one of the subscribers and to emit a voltage jump onto the bus when a subscriber is addressed and to measure the echo pulse length, whereas each subscriber has a load circuit on the bus, which load circuit can be temporarily activatable for echo reflection.

8. A device according to the claim 7, wherein the load circuit has a short-circuit switch.

9. A device according to claim 7, wherein the master has pulse shaping circuits.

10. A device according to claim 8, wherein the master has pulse shaping circuits.

11. A device according to claim 9, wherein the master has an integrator for measuring a distance-dependent length of the idealized differential signal comprising an emitted square-wave signal and thus a superimposed echo signal.

* * * * *